(12) United States Patent
Mimura et al.

(10) Patent No.: US 8,147,593 B2
(45) Date of Patent: Apr. 3, 2012

(54) ABSORBING SOLUTION, METHOD AND DEVICE FOR ABSORBING $CO_2$ OR $H_2S$ OR BOTH

(75) Inventors: Tomio Mimura, Osaka (JP); Yasuyuki Yagi, Osaka (JP); Kouki Ogura, Osaka (JP); Masaki Iijima, Hiroshima (JP); Toru Takashina, Hiroshima (JP); Hiroshi Tanaka, Hiroshima (JP); Takuya Hirata, Hiroshima (JP)

(73) Assignees: Mitsubishi Heavy Industries, Ltd., Tokyo (JP); The Kansai Electric Power Co., Inc., Osaka-Shi (JP)

( * ) Notice: Subject to any disclaimer, the term of this patent is extended or adjusted under 35 U.S.C. 154(b) by 741 days.

(21) Appl. No.: 11/659,975

(22) PCT Filed: Apr. 3, 2006

(86) PCT No.: PCT/JP2006/007054
§ 371 (c)(1),
(2), (4) Date: Jul. 26, 2007

(87) PCT Pub. No.: WO2006/107026
PCT Pub. Date: Oct. 12, 2006

(65) Prior Publication Data
US 2008/0078292 A1    Apr. 3, 2008

(30) Foreign Application Priority Data
Apr. 4, 2005    (JP) ................ 2005-107950

(51) Int. Cl.
*B01D 53/14*    (2006.01)
(52) U.S. Cl. ........... 95/235; 95/236; 423/228; 423/229; 252/60; 96/234

(58) Field of Classification Search ................ 95/235; 423/229
See application file for complete search history.

(56) References Cited

U.S. PATENT DOCUMENTS

| | | | |
|---|---|---|---|
| 3,535,260 A | | 10/1970 | Singh |
| 3,856,921 A | * | 12/1974 | Shrier et al. ............... 423/228 |
| 4,273,937 A | * | 6/1981 | Gum et al. ................... 564/2 |
| 4,336,233 A | * | 6/1982 | Appl et al. ................. 423/228 |
| 4,344,863 A | * | 8/1982 | Robbins et al. ............. 252/192 |
| 4,405,577 A | * | 9/1983 | Sartori et al. ............... 423/233 |
| 4,446,119 A | * | 5/1984 | DuPart et al. .............. 423/228 |
| 4,483,833 A | * | 11/1984 | Stogryn et al. ............. 423/228 |
| 4,537,753 A | * | 8/1985 | Wagner et al. ............. 423/228 |
| 4,696,803 A | * | 9/1987 | Nieh ......................... 423/228 |

(Continued)

FOREIGN PATENT DOCUMENTS

EP    0121109 A2    10/1984
(Continued)

*Primary Examiner* — Duane Smith
*Assistant Examiner* — Pankti Patel
(74) *Attorney, Agent, or Firm* — Birch, Stewart, Kolasch & Birch, LLP

(57) ABSTRACT

An absorbing solution according to the present invention is an absorbing solution that absorbs $CO_2$ or $H_2S$ in gas or both of $CO_2$ and $H_2S$. The absorbing solution is formed by adding desirably 1 to 20 weight percent of tertiary monoamine to a secondary-amine composite absorbent such as a mixture of secondary monoamine and secondary diamine. Consequently, it is possible to control degradation in absorbing solution amine due to oxygen or the like in gas. As a result, it is possible to realize a reduction in an absorption loss, prevention of malfunction, and a reduction in cost. This absorbing solution is suitably used in an apparatus for removing $CO_2$ or $H_2S$ or both of $CO_2$ and $H_2S$.

8 Claims, 1 Drawing Sheet

U.S. PATENT DOCUMENTS

| | | | |
|---|---|---|---|
| 4,814,104 A * | 3/1989 | Kubek et al. | 252/189 |
| 4,840,777 A | 6/1989 | Faucher | |
| 5,246,619 A * | 9/1993 | Niswander | 252/183.11 |
| 5,618,506 A * | 4/1997 | Suzuki et al. | 423/228 |
| 5,648,053 A * | 7/1997 | Mimura et al. | 423/210 |
| 6,036,931 A * | 3/2000 | Yoshida et al. | 423/228 |
| 6,165,433 A * | 12/2000 | Chakravarti et al. | 423/229 |
| 6,207,121 B1 * | 3/2001 | Rooney | 423/228 |
| 6,267,939 B1 * | 7/2001 | Gemes et al. | 423/228 |
| 6,337,059 B1 * | 1/2002 | Schubert et al. | 423/210 |
| 6,423,282 B1 * | 7/2002 | Araki et al. | 423/210 |
| 6,436,174 B1 * | 8/2002 | Grossmann et al. | 95/191 |
| 6,582,498 B1 * | 6/2003 | Sass et al. | 95/211 |
| 6,689,332 B1 * | 2/2004 | Yoshida et al. | 423/220 |
| 6,852,144 B1 * | 2/2005 | Wagner et al. | 95/181 |
| 7,004,997 B2 * | 2/2006 | Asprion et al. | 95/235 |
| 7,056,482 B2 * | 6/2006 | Hakka et al. | 423/230 |
| 7,374,734 B2 * | 5/2008 | Grossman et al. | 423/220 |
| 7,481,988 B2 * | 1/2009 | Katz et al. | 423/220 |
| 7,901,487 B2 * | 3/2011 | Rochelle | 95/160 |
| 2002/0083833 A1 | 7/2002 | Nalette et al. | |
| 2004/0036055 A1 * | 2/2004 | Asprion et al. | 252/180 |
| 2004/0253159 A1 | 12/2004 | Hakka et al. | |
| 2005/0166756 A1 * | 8/2005 | Brok et al. | 95/235 |
| 2005/0211092 A1 * | 9/2005 | Nielsen et al. | 95/236 |
| 2006/0138384 A1 * | 6/2006 | Grossman et al. | 252/190 |
| 2006/0162559 A1 * | 7/2006 | Asprion et al. | 95/235 |
| 2006/0185512 A1 * | 8/2006 | Schubert | 95/235 |
| 2007/0044658 A1 * | 3/2007 | Rochelle et al. | 95/236 |
| 2008/0098892 A1 * | 5/2008 | Asprion et al. | 95/236 |

FOREIGN PATENT DOCUMENTS

| | | |
|---|---|---|
| EP | 0880991 A1 | 12/1998 |
| EP | 1016445 A1 | 7/2000 |
| EP | 0705637 B1 | 9/2001 |
| JP | 52-63171 A | 5/1977 |
| JP | 8-252430 A | 10/1996 |
| JP | 2001-025627 | 1/2001 |
| JP | 2003-230812 A | 8/2003 |
| JP | 2004-504131 A | 2/2004 |
| WO | WO 00/66249 A1 | 11/2000 |

* cited by examiner

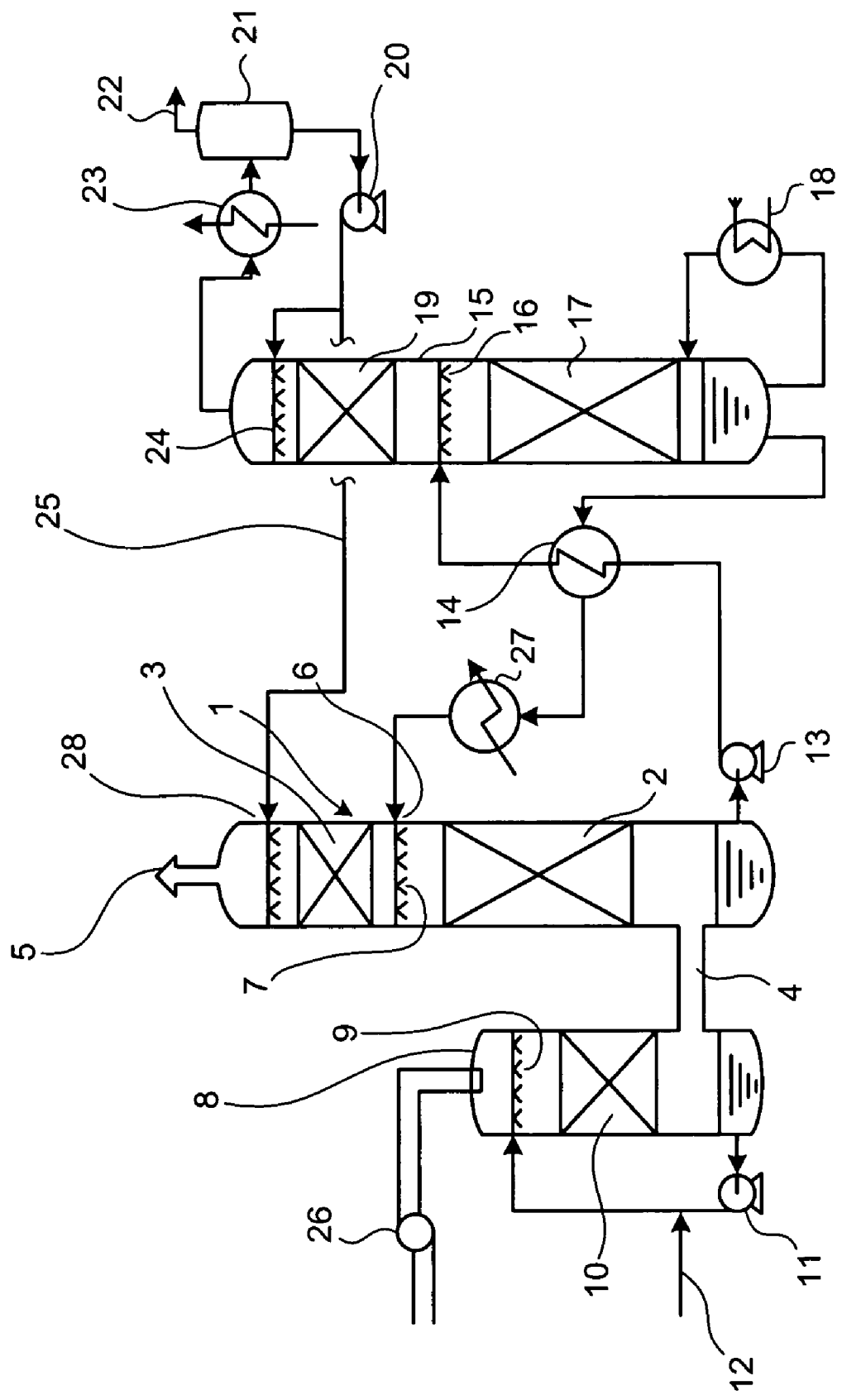

ABSORBING SOLUTION, METHOD AND DEVICE FOR ABSORBING $CO_2$ OR $H_2S$ OR BOTH

TECHNICAL FIELD

The present invention relates to an absorbing solution that removes any one of carbon dioxide ($CO_2$) and hydrogen sulfide ($H_2S$) or both of $CO_2$ and $H_2S$ contained in gas, and an apparatus and a method that removes any one of $CO_2$ and $H_2S$ or both of $CO_2$ and $H_2S$ by using the absorbing solution.

BACKGROUND ART

Conventionally, have been studied a method of collecting and removing acid gases, in particular, $CO_2$ that are contained in gases (treatment object gases), for example various industrial gases manufactured in chemical plants such as a natural gas and a synthesis gas and flue gases, and various methods have been proposed.

For example, for the flue gases, have been actively studied a method of bringing $CO_2$ in a flue gas into contact with an alkanolamine solution or the like to remove and collect $CO_2$, and a method of storing $CO_2$ without emitting $CO_2$ to the atmosphere.

As the alkanolamine, it is possible to use monoethanolamine (MEA), 2-methylaminoethanol, 2-ethylaminoethanol, 2-propylaminoethanol, n-buthylaminoethanol, 2-(isopropylamino)ethanol, and 3-ethylaminoethanol.

For example, an absorbing-solution formed of a mixture of secondary amine or a mixture of secondary amine and tertiary amine is disclosed in a United States Patent specification. It is proposed that this mixed absorbing-solution is an advantageous absorbing-solution because an absorbing ability and regeneration energy are substantially improved in the mixed absorbing solution compared with an MEA single absorbing solution (Patent Document 1).

When a monoethanolamine (MEA) absorbing solution is used, there is a problem in that degradation in the absorbing-solution severely progresses because of oxygen or the like in gas.

Therefore, conventionally, a method has been proposed for stabilizing an absorbing-solution by adding, for example, trialkanolamine or methyldiethanolamine (MDEA) to the absorbing-solution (Patent Document 2 and Patent Document 3).

Patent Document 1: U.S. Pat. No. 5,618,506 specification
Patent Document 2: U.S. Pat. No. 3,535,260 specification
Patent Document 3: U.S. Pat. No. 4,840,777 specification

DISCLOSURE OF INVENTION

Problem to Be Solved by the Invention

However, in the patent documents, disclosed are demonstrations for the absorbing ability and the like for the absorbing-solution formed of the mixture of secondary amine. However, not disclosed is a method of preventing degradation in the absorbing-solution due to oxygen or the like in gas. Further control of degradation in the absorbing-solution still remains a problem to solve.

Taking the problem into consideration, it is an object of the present invention to provide an absorbing-solution which can prevent self-degradation due to oxygen or the like that is present in gas, and a method and an apparatus for removing any one of $CO_2$ and $H_2S$ or both.

Means for Solving Problem

To overcome the above problems, according to claim 1, an absorbing-solution that absorbs any one of $CO_2$ and $H_2S$ or both that are present in gas includes secondary-amine composite absorbent; and tertiary monoamine that is added to the secondary-amine composite absorbent.

According to claim 2, the absorbing-solution according to claim 1, wherein the secondary-amine composite absorbent is a mixture of secondary monoamine and secondary diamine.

According to claim 3, the absorbing-solution according to claim 2, wherein the secondary monoamine is a compound that is selected from at least one kind of 2-methylaminoethanol, 2-ethylaminoethanol, 2-n-propylaminoethanol, 2-n-buthylaminoethanol, 2-n-penthylaminoethanol, 2-isopropylaminoethanol, 2-sec-buthyleamnoethanol, and 2-isobuthylaminoethanol, and the secondary diamine is a compound that is selected from at least one kind of piperazine, 2-metylpiperazine, 2,3-dimethylpiperazine, 2,5-dimethylpiperazine, N,N'-dimethylethanediamine, N,N'-dimethylpropanediamine, N,N'-diethylethylenediamine, N,N'-diethylpropanediamine, N,N'-diisopropylethylenediamine, and N,N'-ditartiary-buthylethanediamine.

According to claim 4, the absorbing-solution according to claim 1, wherein 1 to 20 weight percent of the tertiary monoamine is added to the secondary-amine composite absorbent.

According to claim 5, the absorbing-solution according to claim 2, wherein 2.5 to 100 weight percent of the secondary diamine is added to the secondary monoamine.

According to claim 6, a removing apparatus that removes any one of $CO_2$ and $H_2S$ or both includes an absorber that brings therein the gas that includes any one of $CO_2$ and $H_2S$ or both into an absorbing-solution to contact so as to remove any one of $CO_2$ and $H_2S$ or both; and a regenerator that regenerates a solution that absorbs any one of $CO_2$ and $H_2S$ or both, wherein the absorber re-uses the solution that is regenerated by the regenerator to remove any one of $CO_2$ and $H_2S$ or both, the absorbing-solution being any one of that according to claims 1 to 5.

According to claim 7, a method for a removing apparatus to remove any one of $CO_2$ and $H_2S$ or both includes bringing gas that includes any one of $C0_2$ and $H_2S$ or both into an absorbing-solution to contact; removing any one of $CO_2$ and $H_2S$ or both in an absorber; regenerating the solution that absorbs any one of $CO_2$ and $H_2S$ or both at the removing in a regenerator; and re-using the solution that is regenerated at the regenerating in the absorber, wherein the removing includes removing any one of $CO_2$ and $H_2S$ or both by using an absorbing-solution that is according to any one of claims 1 to 5.

Effects of the Invention

According to the embodiment of the present invention, it is possible to reduce a loss of an absorbing-solution due to degradation in amine used as the absorbing-solution, to prevent deterioration of performance, and to reduce a cost.

BRIEF DESCRIPTION OF DRAWINGS

FIG. 1 is a diagram for explaining an example of a process that can be adopted in the present invention.

EXPLANATIONS OF LETTERS OR NUMERALS

1 Decarbonator
15 Absorbing-solution regenerator

BEST MODE(S) FOR CARRYING OUT THE INVENTION

Exemplary embodiment of the present invention is explained in detail below with reference to the drawings. The present invention is not limited by the embodiment and an example. Components in the embodiment and the example include components that those skilled in the art can easily anticipate, or include components that are substantially identical with the components that those skilled in the art can easily anticipate.

Embodiment of the Invention

An absorbing solution according to an embodiment of the present invention is an absorbing solution that absorbs any one of $CO_2$ and $H_2S$ or both of $CO_2$ and $H_2S$ in gas. The absorbing solution is formed by adding tertiary monoamine to a secondary-amine composite absorbent. Consequently, it is possible to control degradation in amine in the absorbing solution due to oxygen or the like in gas.

It is desirable that the secondary-amine composite absorbent is a mixture of secondary monoamine and secondary diamine.

The secondary monoamine is of an amine compound represented by Formula (1) below.

$$R^1CHR^2NHCH_2CH_2OH \quad (1)$$

In the formula, $R^1$ represents a lower alkyl group with a hydrogen or carbon number 1. to 4 and $R^2$ represents a hydrogen or methyl group.

Specifically, examples of the secondary monoamine include a compound selected from at least one kind of 2-methylaminoethanol, 2-ethylaminoethanol, 2-n-propylaminoethanol, 2-n-buthylaminoethanol, 2-n-penthylaminoethanol, 2-isopropylaminoethanol, 2-sec-butyleamnoethanol 2-sec-buthyleamnoethanol, and 2-isobuthylaminoethanol. However, the present invention is not limited to this.

Examples of the secondary diamine include a compound selected from at least one kind of piperazine, 2-methylpiperazine, 2,3-dimethylpiperazine, 2,5-dimethylpiperazine, N,N'-dimethylethanediamine, N,N'-dimethylpropanediamine, N,N'-diethylethylenediamine, N,N'-diethylpropanediamine, N,N'-diisopropylethylenediamine, and N,N'-ditartiary-buthylethanediamine. However, the present invention is not limited to this.

It is assumed that the tertiary monoamine is an amine compound indicated by Formula (2) below.

$$R^3R^4NR^5OH \quad (2)$$

R3 is a lower alkyl group with a carbon number 1 to 4, R4 is a lower alkyl group or hydroxyethyl group with a carbon number 1 to 4, and R5 is a lower alkyl group with a carbon number 2 to 4.

As the tertiary monoamine indicated by Formula (2), it is desirable to use, for example, N-methyldiethanolamine (MDEA), N-ethyldiethanolamine, N-butyldiethanolamine, 2-dimethylaminoethanol, 2-diethylaminoethanol, 2-di-n-butylaminoethanol, N-ethyl-N-methylethanolamine, 3-dimethylanimo-1-propanol, 2-dimethylamino-2-methyl-1-propanol, or 4-dimethylamino-1-butanol. However, the present invention is not limited to this.

It is desirable to set a percentage of addition of tertiary monoamine to the secondary-amine composite absorbent to 1 to 20 weight percent.

This is because, as indicated by Table 1 below, when the percentage exceeds 20 weight percent, a fall in an absorption capacity undesirably increases.

On the other hand, when the percentage is lower than 1 weight percent, undesirably, it is impossible to eliminate an influence of contaminant.

Table 1

TABLE 1

(50° C., 10 mol % dry $CO_2$ condition)

| Tertiary amine concentration with respect to a mixture of secondary monoamine and secondary diamine (weight %) | Absorption capacity ratio |
|---|---|
| 0 | 1 (reference) |
| 10 | 0.99 |
| 20 | 0.96 |
| 30 | 0.93 |

A percentage of addition of secondary diamine to secondary monoamine is not specifically limited. However, it is desirable to add 2.5 to 100 weight % of secondary diamine.

A process that can be adopted in the method of removing $CO_2$ or $H_2S$ in a flue gas or both of $CO_2$ and $H_2S$ according to the present invention is not specifically limited. An example of the process is explained with reference to FIG. 1.

In FIG. 1, only main equipment is shown and additional equipment is not shown. In FIG. 1, reference numeral 1 denotes a decarbonator; 2, a lower filling unit; 3, an upper filling unit or a tray; 4, a decarbonator flue-gas supply port; 5, a decarbonator flue-gas exhaust port; 6, an absorbing-solution supply port; 7, nozzles; 8, a flue gas cooler provided when needed; 9, nozzles; 10, a filling unit; 11, a humidifying-coolant circulation pump; 12, a makeup-water supply line; 13, an absorbing-solution discharge pump for an absorbing-solution in which $CO_2$ is absorbed; 14, a heat exchanger; 15, an absorbing-solution regenerator; 16, nozzles; 17, a lower filling unit; 18, a reboiler; 19, an upper filling unit; 20, a reflux water pump; 21, a $CO_2$ separator; 22, a collected $CO_2$ exhaust line; 23, a regenerator reflex cooler; 24, nozzles; 25, a regenerator reflux-water supply line; 26, a flue-gas supply blower; 27, a cooler, and 28, a regenerator reflux-water supply port.

In FIG. 1, a flue gas is squeezed into the flue gas cooler 8 by the flue-gas supply blower [translator's comment: reference numeral 26 should be affixed]. The flue gas comes into contact with a humidifying coolant from the nozzles 9 in the filling unit 10 and is humidified and cooled and led to the decarbonator 1 through the decarbonator flue-gas supply port 4. The humidifying coolant coming into contact with the flue gas accumulates in a lower part of the flue gas cooler 8 and is circulated to the nozzles 9 by the pump 11 and used. Since the humidifying coolant is gradually lost by humidifying and cooling the flue gas, the humidifying coolant is filled by the makeup-water supply line 12.

The flue gas squeezed into the decarbonator 1 is brought into counter-contact with an absorbing-solution of a fixed concentration supplied from the nozzles 7 in the lower filling unit 2. $CO_2$ in-the decarbonated flue gas is absorbed and removed by the absorbing-solution and the decarbonated flue gas flows to the upper filling unit 3. The absorbing-solution supplied to the decarbonator 1 absorbs $CO_2$. Temperature of the absorbing-solution usually rises to be higher than temperature in the absorbing-solution supply port 6 because of reaction heat due to the absorption. The absorbing-solution is sent to the heat exchanger 14 by the absorbing-solution discharge pump 13 for the absorbing-solution in which $CO_2$ is absorbed. The absorbing-solution is heated and led to the absorbing-solution regenerator 5. It is possible to perform temperature adjustment for the absorbing-solution regenerated using the heat exchanger 14 or the cooler 27 provided between the heat exchanger 14 and the absorbing-solution supply port' 6 as required.

In the absorbing-solution regenerator 15, the absorbing-solution is regenerated in the lower filling unit 17 according to heating by the reboiler 18, cooled by the heat exchanger 14, and returned to the decarbonator 1. In an upper part of the absorbing-solution regenerator 15, $CO_2$ separated from the absorbing-solution comes into contact with a reflux water supplied from the nozzles 24 in the upper filling unit 19 and cooled by the regenerator reflux cooler 23. Water vapor accompanying $CO_2$ is separated from the condensed reflux water by the $CO_2$ separator 21 and led to a $CO_2$ collection process from the collected $CO_2$ exhaust line 22. The reflux water is partially refluxed to the regenerator by the reflux water pump 20 and partially supplied to the regenerator reflux-water supply port 28 of the decarbonator 1 through the regenerator reflux-water supply line 25. Since a small quantity of absorbing-solution is contained in this regenerated reflux water, the absorbing-solution comes into contact with exhaust gas in the upper filling unit 3 of the decarbonator 1 and contributes to removal of a small quantity of $CO_2$ contained in the exhaust gas.

EXAMPLE

An example according to the present invention is explained.

In the example, temperature was set to 60° C. and oxygen concentration in gas was set to 20 mol %.

As a compounding ratio, concentration of tertiary amine with respect to a mixture of secondary monoamine and a secondary diamine was set to 2 weight percent.

In this example, secondary monoamine was used and a piperazine compound was used as secondary diamine to form a secondary-amine composite absorbent. 2 weight percent of methyldiethanolamine (MDEA) was added to the secondary-amine composite absorbent as tertiary monoamine. Thereafter, a predetermined quantity of water was added to the secondary-amine composite absorbent to form a $CO_2$ absorbing-solution. Concentration of a decomposition product (a vapor-like basic compound) in the $CO_2$ absorbing-solution obtained was 8 ppm.

On the other hand, concentration of a decomposition product (a vapor-like basic compound) in a $CO_2$ absorbing-solution formed of a secondary monoamine and a piperazine compound, which was a comparative example in which 2 weight percent of methyldiethanolamine (MDEA) was not added to the secondary-amine composite absorbent as tertiary monoamine, was 15 ppm Thus, it was found that, when tertiary monoamine was added to the secondary-amine composite absorbent, it is possible to control degradation due to oxygen in exhaust gas.

INDUSTRIAL APPLICABILITY

As described above, the absorbing-solution according to the present invention is suitably used in a facility that removes $CO_2$ or $H_2S$ in a flue gas or both of $CO_2$ and $H_2S$, in which a reduction in a loss of an absorbing-solution due to degradation in absorbing-solution amine, prevention of malfunction, and a reduction in cost can be realized.

The invention claimed is:

1. An absorbing-solution that absorbs at least one of $CO_2$ and $H_2S$ that are present in a gas, the absorbing-solution comprising:

a secondary-amine composite absorbent which is a mixture of a secondary monoamine and a secondary diamine; and a tertiary monoamine that is added to the secondary-amine composite absorbent, wherein the tertiary monoamine concentration with respect to the mixture of secondary monoamine and secondary diamine is set to 1 to 20 weight percent.

2. The absorbing-solution according to claim 1, wherein the secondary monoamine is at least one member selected from the group consisting of 2-methylaminoethanol, 2-ethylaminoethanol, 2-n-propylaminoethanol, 2-n-butylaminoethanol, 2-n-pentylaminoethanol, 2-isopropylaminoethanol, 2-sec-butylaminoethanol, and 2-isobutylaminoethanol, and the secondary diamine is at least one member selected from the group consisting of piperazine, 2-methylpiperazine, 2,3-dimethylpiperazine, 2,5-dimethylpiperazine, N,N'-dimethylethanediamine, N,N'-dimethylpropanediamine, N,N'-diethylethanediamine, N,N'-diethylpropanediamine, N,N'-diisopropylethylenediamine, and N,N'-ditertiary-butylethanediamine.

3. The absorbing-solution according to claim 1, wherein the secondary monoamine is at least one member selected from the group consisting of 2-methylaminoethanol, 2-ethylaminoethanol, 2-n-propylaminoethanol, 2-n-butylaminoethanol, 2-n-pentylaminoethanol, 2-isopropylaminoethanol, 2-sec-butylaminoethanol, and 2-isobutylaminoethanol, and the secondary diamine is at least one member selected from the group consisting of piperazine, 2-methylpiperazine, 2,3-dimethylpiperazine, and 2,5-dimethylpiperazine.

4. The absorbing-solution according to claim 1, wherein 2.5 weight percent to less than 100 weight percent of the secondary diamine is added to the secondary monoamine.

5. A removing apparatus which removes at least one of $CO_2$ and $H_2S$ that are present in a gas, the removing apparatus comprising:

an absorber that receives the gas and causes the gas to come into contact with an absorbing-solution whereby at least one of $CO_2$ and $H_2S$ is absorbed by the absorbing-solution; and a regenerator that regenerates the absorbing-solution which has absorbed at least one of $CO_2$ and $H_2S$ by removing any one of $CO_2$ and $H_2S$ or both from the absorbing-solution, and that supplies the absorbing-solution from which at least one of $CO_2$ and $H_2S$ has been removed to the absorber, wherein the absorbing-solution includes a secondary-amine composite absorbent which is a mixture of a secondary monoamine and a secondary diamine and a tertiary monoamine that is added to the secondary-amine composite absorbent, wherein the tertiary monoamine concentration with respect to the mixture of secondary monoamine and secondary diamine is set to 1 to 20 weight percent.

6. The removing apparatus according to claim 5, wherein the mixture contains 2.5 to less than 100 weight percent of the secondary diamine based on the secondary monoamine.

7. A method of removing apparatus to remove at least one of $CO_2$ and $H_2S$ that are present in a gas, the method comprising:

causing the gas to come into contact with an absorbing-solution whereby at least one of $CO_2$ and $H_2S$ is absorbed by the absorbing-solution; and regenerating the absorbing-solution that absorbed any one of $CO_2$ and $H_2S$ by removing at least one of $CO_2$ and $H_2S$ from the absorbing-solution, wherein the causing step includes causing the gas to come into contact with an absorbing-solution that is regenerated in the regenerating step, and wherein the absorbing-solution includes a secondary-amine composite absorbent which is a mixture of a secondary monoamine and a secondary diamine, and 1 to 20 weight-percent, based on the weight of said secondary-amine composite absorbent, of a tertiary monoamine that is added to the secondary-amine composite absorbent.

8. The method according to claim 7, wherein the mixture contains 2.5 to less than 100 weight percent of the secondary diamine based on the secondary monoamine.

* * * * *

UNITED STATES PATENT AND TRADEMARK OFFICE
CERTIFICATE OF CORRECTION

| | | |
|---|---|---|
| PATENT NO. | : 8,147,593 B2 | Page 1 of 1 |
| APPLICATION NO. | : 11/659975 | |
| DATED | : April 3, 2012 | |
| INVENTOR(S) | : Tomio Mimura et al. | |

It is certified that error appears in the above-identified patent and that said Letters Patent is hereby corrected as shown below:

ON THE TITLE PAGE:

At item (86), PCT No., change "PCT/JP2006/007054" to --PCT/JP2006/307054--.

Signed and Sealed this
Nineteenth Day of June, 2012

David J. Kappos
*Director of the United States Patent and Trademark Office*